(12) United States Patent
Coffey et al.

(10) Patent No.: US 8,362,407 B2
(45) Date of Patent: Jan. 29, 2013

(54) APPARATUS FOR PARTICLE SYNTHESIS

(75) Inventors: Calvin Thomas Coffey, Watkins Glen, NY (US); Andrey V Filippov, Painted Post, NY (US); Clinton Damon Osterhout, Beaver Dams, NY (US); Martin Andrew Sala, Campbell, NY (US); Carlton Maurice Truesdale, Corning, NY (US)

(73) Assignee: Corning Incorporated, Corning, NY (US)

( * ) Notice: Subject to any disclaimer, the term of this patent is extended or adjusted under 35 U.S.C. 154(b) by 82 days.

(21) Appl. No.: 12/939,445

(22) Filed: Nov. 4, 2010

(65) Prior Publication Data

US 2011/0052460 A1  Mar. 3, 2011

Related U.S. Application Data

(62) Division of application No. 11/502,286, filed on Aug. 10, 2006, now abandoned.

(51) Int. Cl.
*H05B 6/30* (2006.01)
*F27B 14/10* (2006.01)
*B01J 19/00* (2006.01)

(52) U.S. Cl. ............ 219/730; 219/649; 65/509; 422/177

(58) Field of Classification Search .................. 219/730, 219/678, 680, 681, 649; 65/345, 500, 404, 65/435, 533, 378, 509, 481; 266/45, 234, 266/275; 164/119, 120, 133, 237, 288; 422/177; 373/159, 155, 138, 139
See application file for complete search history.

(56) References Cited

U.S. PATENT DOCUMENTS

| | | | |
|---|---|---|---|
| 4,450,333 A * | 5/1984 | Andrejco et al. | 65/509 |
| 5,260,538 A | 11/1993 | Clary et al. | 6/2 |
| 5,387,449 A | 2/1995 | Kunz et al. | 428/35.4 |
| 5,848,093 A * | 12/1998 | Goudeau et al. | 373/157 |
| 2002/0005051 A1 | 1/2002 | Brown et al. | 37/18 |
| 2002/0088253 A1 | 7/2002 | Roba et al. | 65/481 |
| 2004/0187525 A1 | 9/2004 | Coffey et al. | 65/390 |
| 2004/0206127 A1 | 10/2004 | Coffey et al. | 65/390 |
| 2006/0054618 A1 | 3/2006 | Agrawal et al. | 6/64 |
| 2008/0038161 A1 | 2/2008 | Marti et al. | 422/177 |

FOREIGN PATENT DOCUMENTS

| | | | |
|---|---|---|---|
| GB | 2121028 A * | 12/1983 | |
| WO | WO 00/20111 | 4/2000 | 8/18 |

OTHER PUBLICATIONS

Kruis, F.E., Fissan, H. and Peled, A. (1998) Synthesis of nanoparticles in the gas phase for electronic, optical and magnetic applications-a review. Jour. Aerosol Sci. 29, 511-523.
Pratsinis, S.E., and S.V.R. Mastrangelo. (1989) Material synthesis in aerosol reactors. Chem. Eng. Prog. 85(5): 62.
Swihart (2003) Vapor-phase synthesis of nanoparticles. Curr.Opin. Coll. Interface Sci. 8 127-133.
Powell, Q.H., Fotou, G.P., Kodas, T.T., Andreson, B.M. and Guo, Y. (1997) Gas-phase coating of TiO2 with SiO2 in a continuous flow hot-wall aerosol reactor. Jour. Mater. Res. 12, 522-559.

\* cited by examiner

*Primary Examiner* — Quang Van
(74) *Attorney, Agent, or Firm* — Tina N. Thompson

(57) ABSTRACT

An apparatus for small particle and nanoparticle synthesis. A durable particle generator capable of high temperature particle synthesis. The particle generator is configured as to minimize susceptor degradation associated with harsh reaction conditions, for example, using encased susceptors.

7 Claims, 6 Drawing Sheets

APPARATUS FOR PARTICLE SYNTHESIS

This Application is a Divisional Application and claims the benefit of priority to U.S. patent application Ser. No. 11/502,286, filed Aug. 10, 2006 now abandoned.

BACKGROUND

1. Field of the Invention

The present invention relates generally to an apparatus for particle synthesis and more particularly to an apparatus capable of clean high temperature synthesis of small particles and nanoparticles.

2. Technical Background

Over the years, there has been rapid progress in the areas of electronics, materials science, and nanoscale technologies resulting in, for example, smaller devices in electronics, advances in fiber manufacturing and new applications in the biotechnology field. The ability to generate increasingly smaller, cleaner and more uniform particles is necessary in order to foster technological advances in areas which utilize small particulate matter. The development of new, efficient and adaptable ways of producing small particulate matter becomes more and more advantageous.

The size of a particle often affects the physical and chemical properties of the particle or compound comprising the particle. For example, optical, mechanical, biochemical and catalytic properties often change when a particle has cross-sectional dimensions smaller than 200 nanometers (nm). When particle sizes are reduced to smaller than 200 nm, these smaller particles of an element or a compound often display properties that are quite different from those of larger particles of the same element or compound. For example, a material that is catalytically inactive in the macroscale can behave as a very efficient catalyst when in the form of nanoparticles.

The aforementioned particle properties are important in many technology areas. For example, in optical fiber manufacturing, the generation of substantially pure silica and germanium soot particles from impure precursors in a particular size range (about 5-300 nm) has been key in providing optical preforms capable of producing high purity optical fiber. Also, in the field of pharmaceuticals, the generation of particles having certain predetermined properties is advantageous in order to optimize, for example, in vivo delivery, bioavailability, stability of the pharmaceutical and physiological compatibility. The optical, mechanical, biochemical and catalytic properties of particles are closely related to the size of the particles and the size of the compounds comprising the particles. Gas-phase methods of particle generation are attractive, since gas-phase methods typically yield large quantities of high purity particles which are within a desirable size range.

Particle generators such as aerosol reactors have been developed for gas-phase nanoparticle synthesis. Examples of these aerosol reactors include flame reactors, tubular furnace reactors, plasma reactors, and reactors using gas-condensation methods, laser ablation methods, and spray pyrolysis methods. In particular, hot wall tubular furnace reactors have proven adept for soot particle generation for silica preform production in optical fiber manufacturing. Hot wall tubular furnace reactors normally use resistive heating elements or use burners to supply energy to reactor walls near the reaction zone.

Induction Soot Generators (ISGs) are examples of hot wall tubular furnace reactors using inductive heating elements to heat the reactor walls. Examples of such ISGs developed for synthesis of silica soot particles for use in optical fiber manufacturing are described in commonly owned US Patent Application Publication 2004/0206127 the disclosure of which is incorporated herein by reference in its entirety. The ISGs described in that reference have inductively heated reactor walls typically made of platinum, rhodium, or a platinum\rhodium compound. A description of one embodiment of an ISG in that reference also shows the use of Radio Frequency (RF) electromagnetic energy to heat certain portions of the reaction zone, and mentions the possible use of graphite as a suitable RF susceptor. ISGs have a number of advantages over other tubular soot generators. For example, combustion is not needed for supplying the energy to heat the reactor walls of the reaction zone in order to support the chemical reaction. Also, there is an increased ability to control the process temperature including the reaction temperature due to the increased control of the energy source as compared to generators using burner heating of the walls of the reaction zone.

However, ISGs do have some disadvantages. For example, the reactor walls of the reaction zone may become damaged due to exposure of the reactor walls to aggressive chemicals, such as chlorine (Cl) and oxygen (O) ions at high temperatures (above 1500° C.). These aggressive environmental conditions are damaging even for reactor walls made from platinum, rhodium, or a platinum\rhodium compound. As a result, the mechanical and induction properties of the reactor walls deteriorate over time. Also, this degradation of the reactor wall materials allows platinum and rhodium compounds to contaminate the synthesized particles. When degradation occurs, the reactor wall material must be replaced, which is both costly and time consuming. It would be advantageous to develop an apparatus capable of high temperature particle synthesis where degradation of the reactor walls is minimized and if any degradation occurs, contamination would be isolated from the reaction area.

SUMMARY OF THE INVENTION

Apparatuses for generating particles are disclosed herein.

In one embodiment of the present invention, the apparatus comprises at least one vessel having an interior space where material is heated and at least one susceptor which is capable of generating heat from energy supplied by an energy source. The susceptor is disposed such that the interior space of the vessel is heated. The susceptor is separated from the interior space via a barrier layer.

In another embodiment of the present invention, the apparatus comprises at least one susceptor which is capable of generating heat from electromagnetic energy in the form of microwave heating or laser heating which provides energy to the susceptor thus heating the precursor materials within the interior space. In this embodiment, the barrier layer may be absent.

In another embodiment of the present invention, the apparatus comprises a plurality of vessels that are connected in sequence. The interior space of each of the plurality of vessels is in fluid communication with the interior space of the next vessel in sequence.

In another embodiment of the present invention, the apparatus comprises at least one inlet for receiving material and at least one cylindrical vessel in fluid communication with the inlet having an interior space for accommodating reactants. The cylindrical vessel has at least one cylindrical susceptor, wherein the susceptor material is selected from the group consisting of platinum, rhodium, graphite, and a platinum\rhodium compound and is capable of being acted upon by electromagnetic energy, generating heat and being disposed such that heat is applied to the interior space. The cylindrical vessel also comprises a barrier layer, wherein the barrier layer material is selected from the group consisting of silica glass and quartz, encasing the cylindrical susceptor wherein a space is present between the cylindrical susceptor and the barrier layer. An energy source is in communication with the cylindrical vessel for providing electromagnetic energy to the cylindrical susceptor.

It would be advantageous to develop an apparatus capable of high temperature particle synthesis where the susceptors are not exposed to aggressive environmental conditions and where the susceptors could be made from inexpensive materials.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention is best understood from the following detailed description when read with the accompanying drawing figures.

DETAILED DESCRIPTION

As used herein:

the term "susceptor" refers to any material capable of generating heat when acted upon by energy from an energy source; and the term "barrier layer" refers to a layer of material disposed in proximity to a susceptor such that the material helps to protect the susceptor against degradation due to environmental conditions within the interior space.

Reference will now be made in detail to the present embodiments of the invention, examples of which are illustrated in the accompanying drawings. Wherever possible, the same reference numbers will be used throughout the drawings to refer to the same or like parts.

Figure 1:
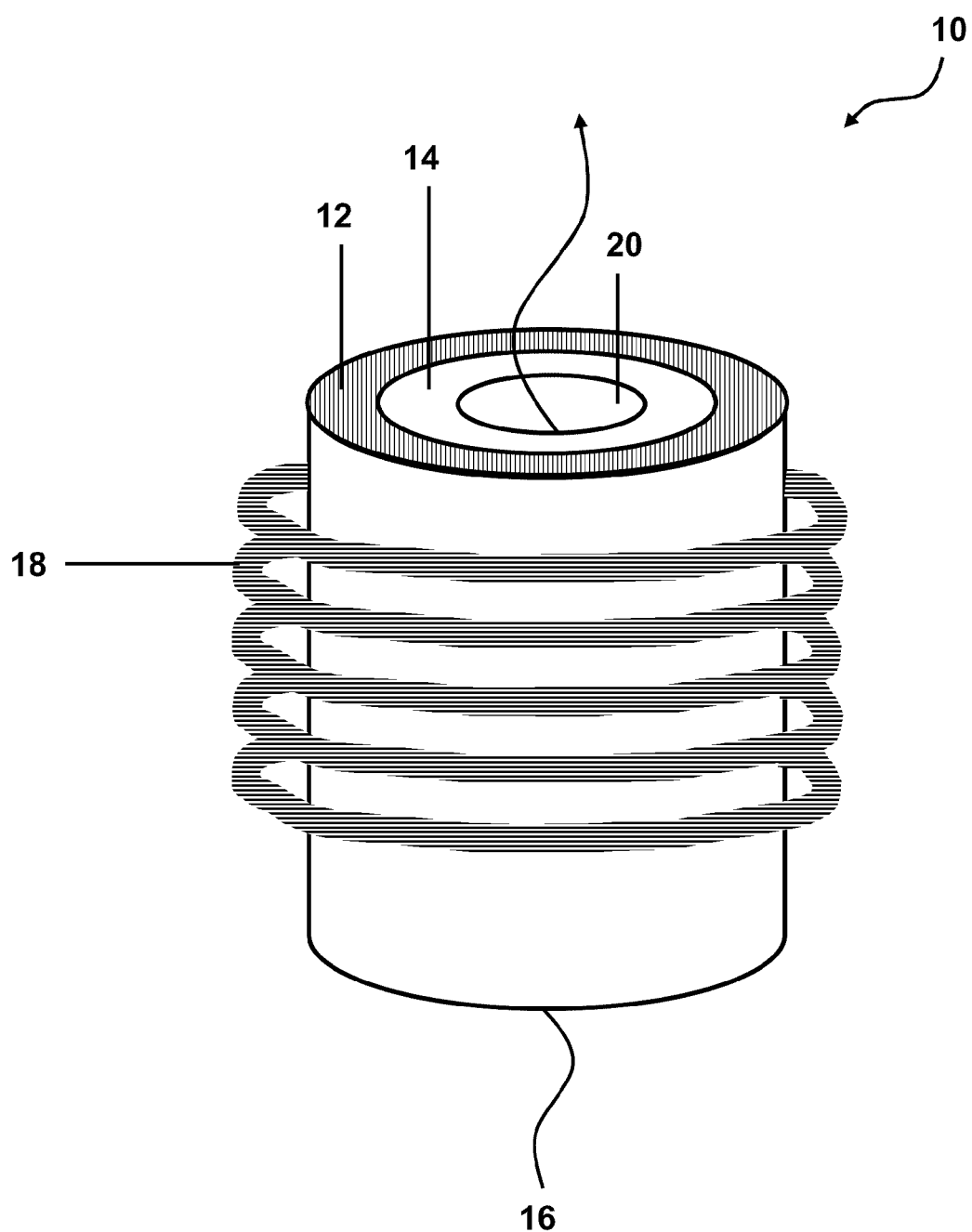
FIG. 1 is a schematic view of an apparatus for generating particles according to one embodiment of the invention.

In the embodiment illustrated in FIG. 1, a particle generator 10 is shown having a susceptor 12 formed into a cylindrically shaped vessel comprising an internal surface which defines an interior space 20 extending generally throughout its axial length for accommodating precursor materials. A continuous flow path 16 goes through the interior space within the vessel, whereby the precursor materials can enter the interior space, e.g., at the bottom of the susceptor, and, after undergoing a chemical reaction resulting from the heat generated by the present invention, emerges from the top of the susceptor in the form of the desired particles. Although the particles emerge from the top of the apparatus in this embodiment, the particles could emerge from the apparatus in other orientations, for example the apparatus could also be positioned horizontally or in other orientation optimizing particle generation and/or flow. The susceptor 12 is capable of absorbing incident energy and thus generating heat, and is disposed such that the heat is transferred to the interior space 20. In this embodiment, the susceptor preferably comprises graphite. A barrier layer 14, preferably comprising quartz, is located between the susceptor and the interior space. An energy source 18, shown here as an induction coil, is located in proximity to the vessel for providing energy to the susceptor. Other conventional induction heating systems can be adapted to meet the needs of this embodiment of the invention.

Although the susceptor 12 is shown in FIG. 1 as being generally cylindrical, the susceptor may be of any shape or size that permits the interior space to accommodate the required amount of precursor material, and permits the arrangement of the energy source, the susceptor of choice and the barrier layer to establish the desired environmental conditions for example, a predetermined temperature range or residence time within the interior space and thus, generate particles from the precursor material having the desired properties.

Although the susceptor 12 shown in FIG. 1 preferably comprises graphite, susceptor materials may alternatively comprise any substantially electrically conductive material such as, platinum, rhodium or a platinum/rhodium compound such as 80/20 platinum/rhodium. The susceptor material should be chosen as to be capable of generating and withstanding the appropriate amount of heat for the intended particle-generating reaction from energy provided by the corresponding energy source as described below.

Although the energy source 18 shown in FIG. 1 provides energy to the susceptor 12 via induction heating, the energy source alternatively may be a source of electromagnetic radiation that impinges directly on the susceptor 12, such radiation being for example, in the Infrared Frequency range, Optical Frequency range or Radio Frequency range.

Figure 5:
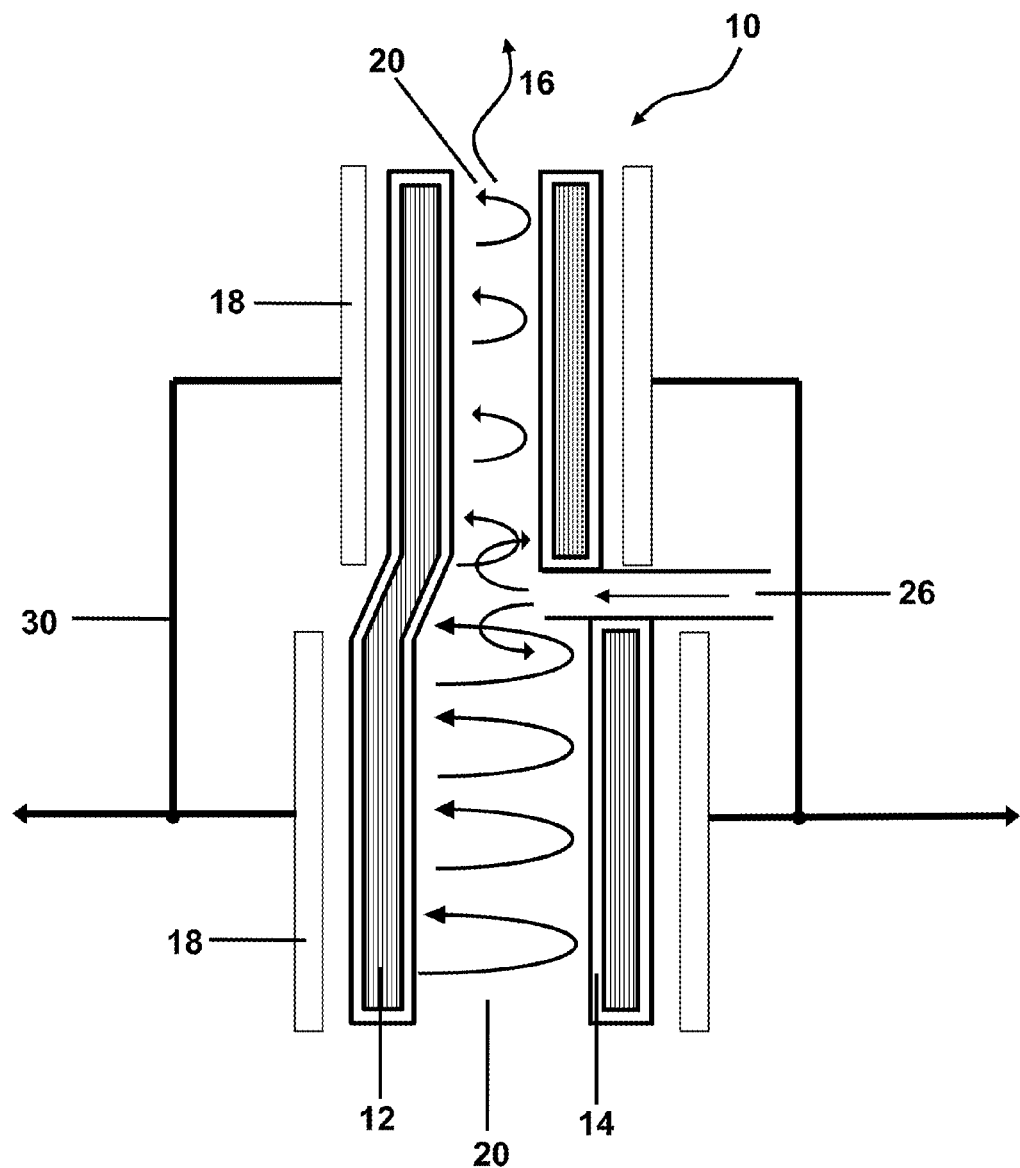
FIG. 5 is a schematic cross-sectional view of an apparatus for generating particles according to another embodiment of the invention.

An alternative energy source is shown in FIG. 5. In this embodiment the energy source 18 is a dielectric heating system comprising water-cooled copper electrodes connected to water-cooled copper lines 30 circulating back to a tank circuit. The tank circuit is a combination of inductive and capacitive components that function together as an electronic resonator and hold the particle generator at a particular frequency. As electrical current alternates between these components (at an angular frequency or wavelength determined by the combined value of the components), proportional "heating" is provided in the electrically conductive or semi-conductive material placed in the center of the inductor and/or proportional "heating" is provided in any "lossy" dielectric material placed between the conductive plates of the capacitor.

Figure 6:
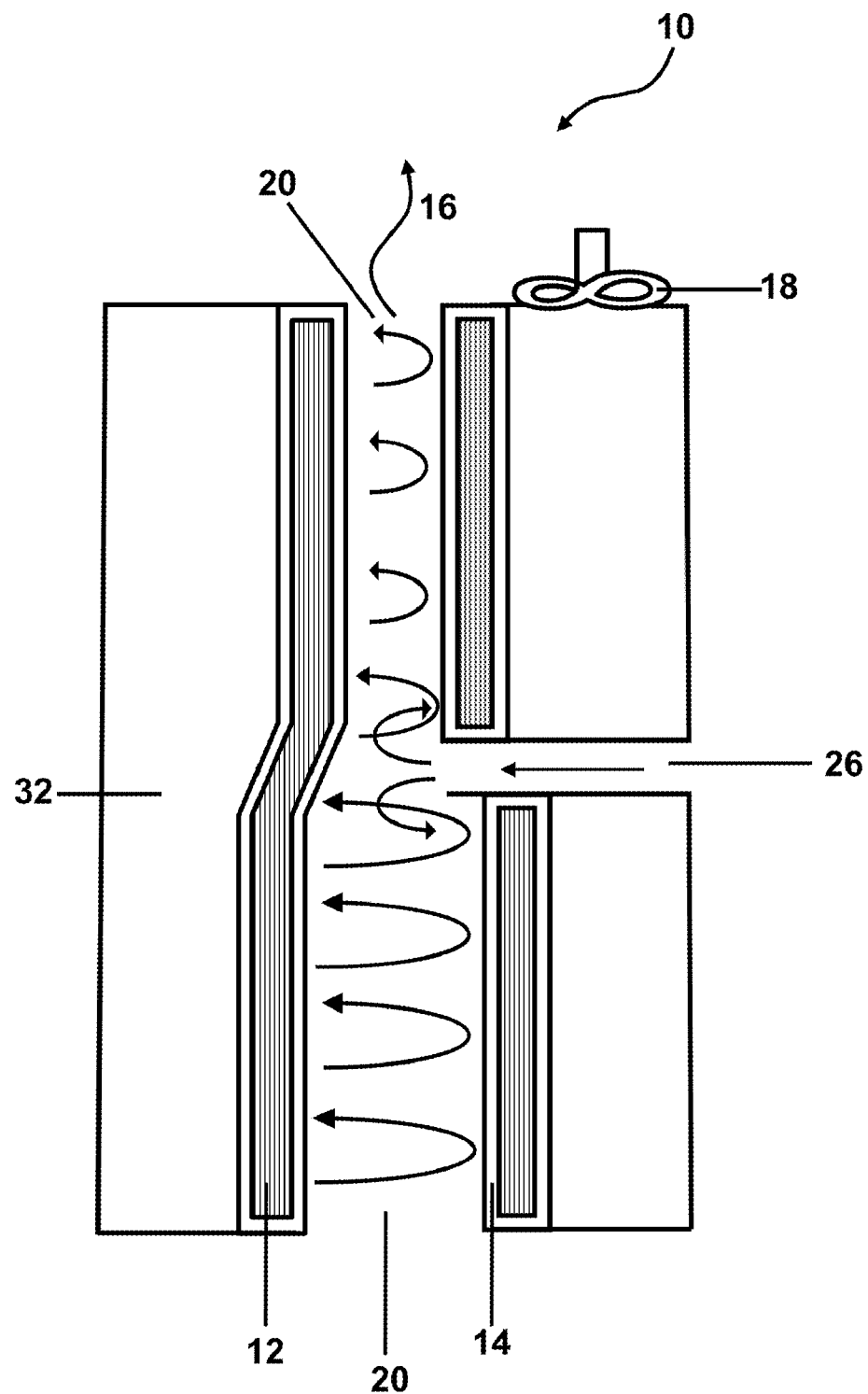
FIG. 6 is a schematic cross-sectional view of an apparatus for generating particles according to another embodiment of the present invention.

An alternative energy source is shown in FIG. 6. In this embodiment a microwave heating system comprises a magnetron as the energy source 18 for distributing microwave energy within a resonant chamber 32.

A laser heating system may be used as another alternative heating method. The laser source is a high power laser working in either a pulsed or continuous mode, while the susceptor comprises a heat resistant and chemically nonreactive material with respect to the reaction occurring within the interior space. The laser heating system can be effectively used in small particle generators, such as when the flow rates and particle volume outputs are small for example, in electronic applications and nanotechnology.

Generally, electromagnetic energy sources allow rapid and precise tuning of the temperature of the reaction within the interior space.

Although the barrier layer 14 shown in FIG. 1 is preferably quartz, the barrier layer may alternatively comprise silica glass, alumina, ceramic or other materials suitable for protecting the susceptor from degradation due to exposure to heat, chemical reactants or chemical byproducts or mechanical abrasion.

Figure 2:
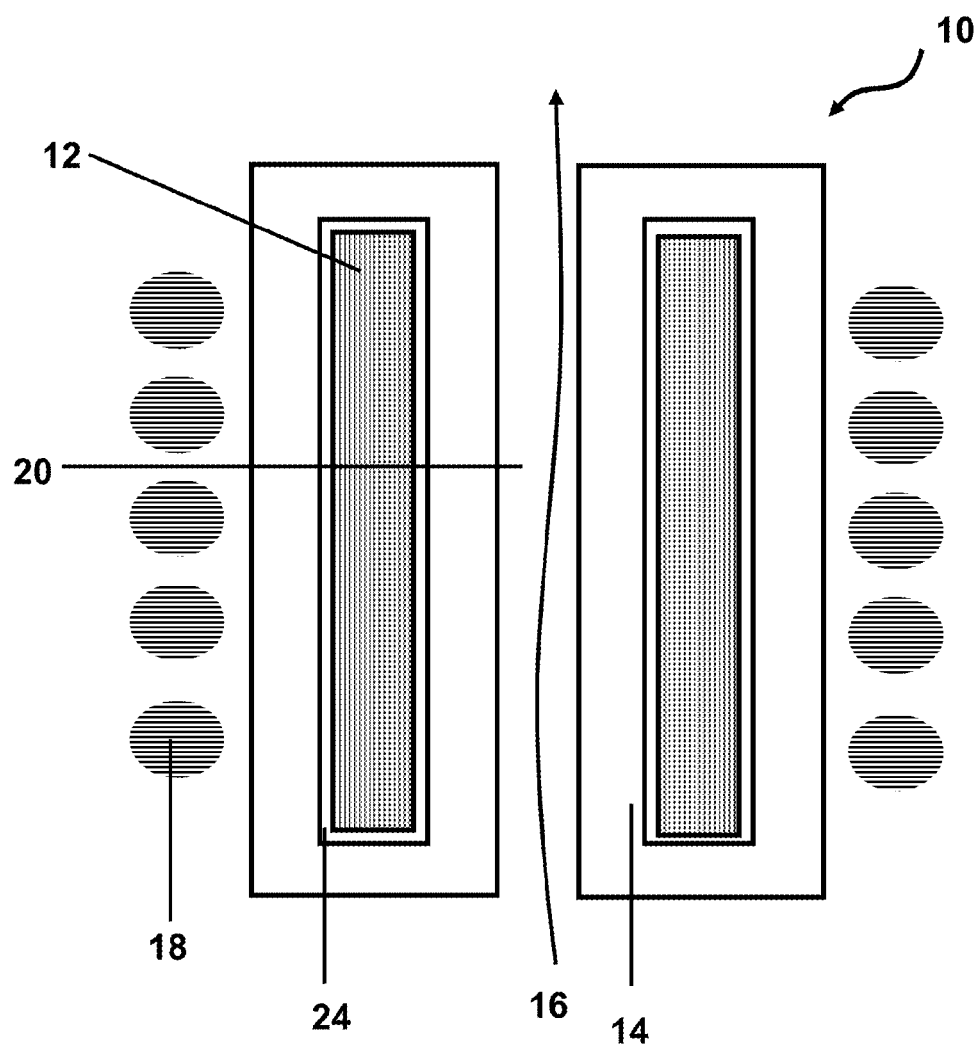
FIG. 2 is a schematic cross-sectional view of an alternative apparatus for generating particles according to another embodiment of the invention.

In the embodiment shown in FIG. 2, the barrier layer 14 encases the graphite susceptor 12 so as to form an envelope surrounding the susceptor. A space 24 is present between the barrier layer and the susceptor to permit expansion of the susceptor within the envelope allowing for some coefficient of thermal expansion (CTE) mismatches between the susceptor material and the barrier layer material. The barrier layer is hermetically sealed and its interior is evacuated. By having the barrier layer completely envelop the susceptor and having the interior volume evacuated, the susceptor is isolated not only from the chemical reactants (i.e., the precursor materials) that produce the desired particles but also from an oxidizing atmosphere that might lead to the oxidation and/or premature degradation of the susceptor. Even if degradation of the susceptor occurs, the susceptor material will remain trapped within the barrier layer envelope. For example, even if a susceptor comprising graphite is reduced to powder form due to degradation from high temperatures, the susceptor material in powder form can still provide heat to the reactant materials within the interior space, since the susceptor material is contained within the barrier layer envelope.

In FIG. 5 and FIG. 6, the barrier layer 14 encases the susceptor 12. Encasing of the susceptor prevents the oxidation of the susceptor and reaction of the susceptor with precursor materials at high temperatures. Without the barrier layer encasing the susceptors, the susceptor may cause arcing to the plates in the dielectric heating system or inside the resonant chamber of the microwave heating system. Although the susceptor 12 in FIG. 5 and FIG. 6 preferably comprises graphite, susceptor materials may alternatively comprise platinum, rhodium, a platinum/rhodium compound such as 80/20 platinum/rhodium, ceramic materials, quartz and silica glass. In some embodiments such as shown in FIG. 5 and FIG. 6, when the susceptor comprises ceramic materials, quartz or silica glass, the particle generator may provide high temperature particle synthesis without the need for a barrier layer.

Generally the barrier layer prevents direct contact of the susceptor with environmental conditions in the interior space which may degrade the susceptor material, such as hot and aggressive chemical conditions. For example, platinum, rhodium, or a platinum\rhodium compounds used as susceptor materials in vessels not having the barrier layer have the disadvantage of pitting as Cl and O ions at high temperatures (above 1500° C.) degrade the materials and deteriorate the susceptor material's heat generating capabilities.

Figure 3:
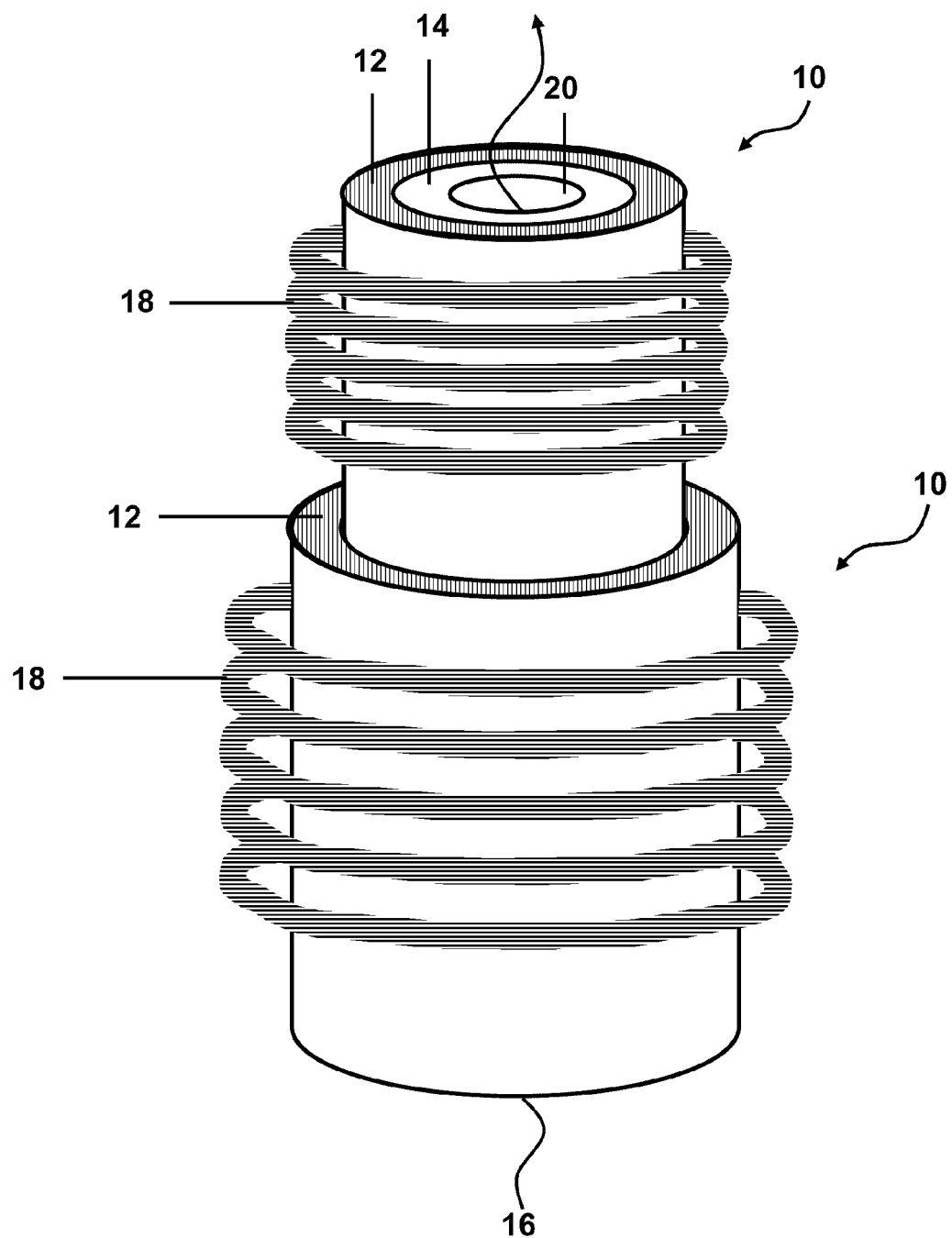
FIG. 3 is a schematic view of an apparatus for generating particles according to another embodiment of the invention having vessels in series.
Figure 4:
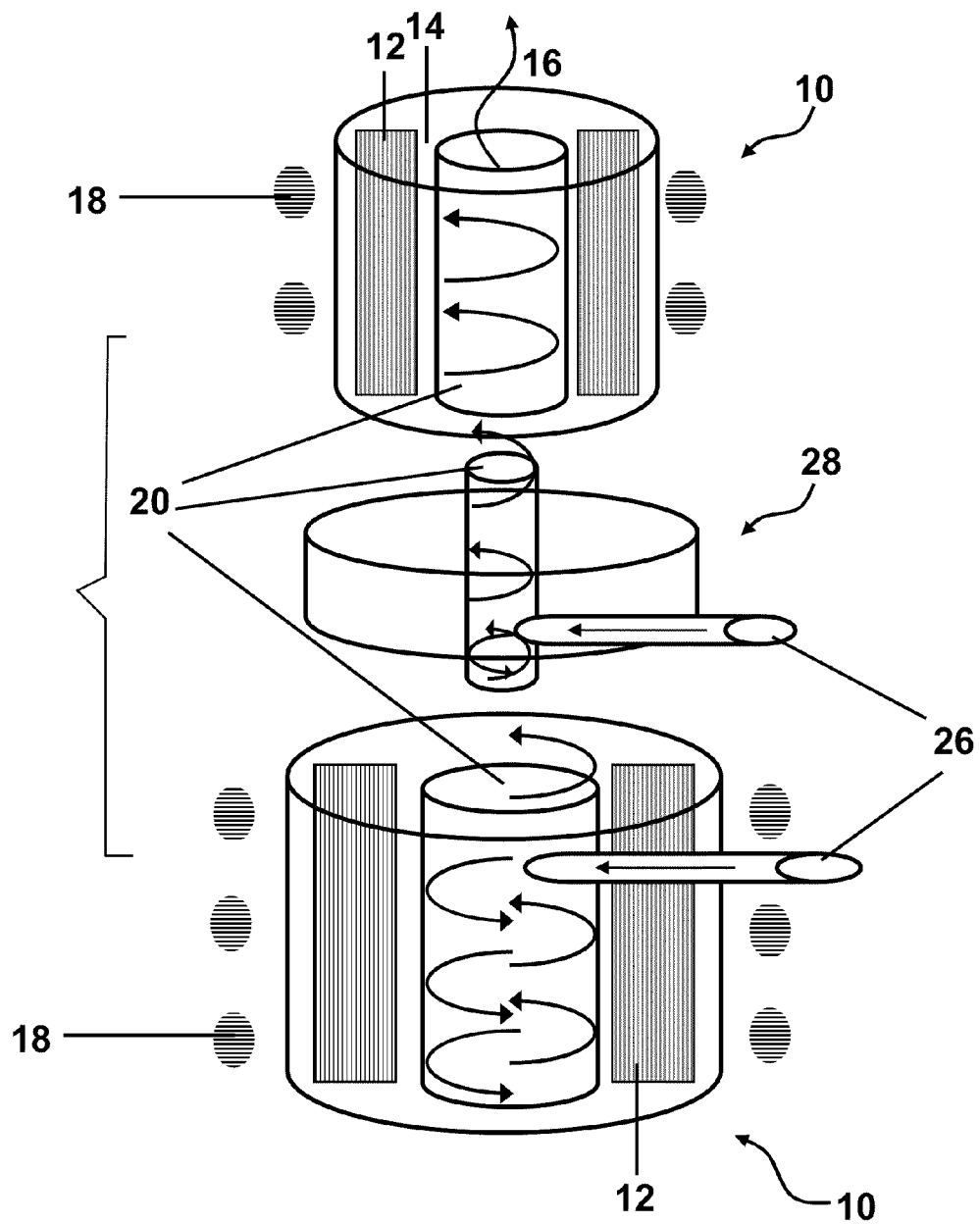
FIG. 4 is an exploded schematic view of an apparatus for generating particles according to another embodiment of the invention having vessels in series.

In the embodiments shown in FIG. 3 and FIG. 4, the particle generator is shown having a plurality of vessels 10. The plurality of vessels is connected in sequence such that the interior space 20 of each of the plurality of vessels is in fluid communication with the interior space of the next vessel in sequence. As a result, the continuous flow path 16 will be connected and flow through each of the plurality of vessels. The energy source 18 of each of the vessels is independent from each other for individual heating of each of the vessels.

The configuration shown in FIG. 3 and FIG. 4 allows for at least one of the plurality of vessels to act as a preheater for heating precursor material to a temperature below the temperature required for generating the desired particles. A temperature gradient may be imposed by a particle generator having individual heating capabilities for each of the plurality of vessels. This temperature gradient could permit gradual heating of particularly sensitive and volatile materials in a very controlled fashion.

Further, in FIG. 4, the continuous flow path 16 in this embodiment is made deliberately tortuous to increase the residence time of the materials and enhance mixing, thereby yielding material with more uniform temperature, composition, and particle size.

Openings 26 are provided into the interior space for introducing material into the apparatus at locations needed to achieve the desired particle generation. Turbulent flow is induced by a spacer 28 which has an interior space with a smaller volume capacity than the attached vessels and/or by strategic placing of the openings into the interior space. In this embodiment, the vessels 10 are cylindrical in shape and comprise susceptors 12 which are cylindrical in shape. The barrier layer 14 encases the susceptors. Energy is supplied by an energy source 18 to the susceptors. The energy source is a source of electromagnetic radiation via induction heating of the susceptor, and the heat is transferred to the interior space 20 through the susceptor by thermal conductivity and radiation. The energy is supplied to the susceptors via an induction coil located in proximity to the susceptor. The induction coil may be water-cooled via a cooling system.

Where the generation of particles occurs is dependent upon factors such as the amount of contact of the precursor materials have with each other, the reaction temperature needed for the reaction to occur and the residence time during which the materials have an opportunity to react. In the case when all precursor materials are mixed together prior to the reaction generating particles, the reaction can begin at the location where the necessary reaction temperature is reached, yielding vapors of desired particles.

In some situations, one or several of the precursor materials are added right after the heated zone, the reaction can start there, at a temperature lower than the maximum temperature achievable in the interior space of the vessel. The subsequent cooling of this gas causes the vapor of the resulting material to nucleate and condense, forming aerosol particles. This nucleation is a result of molecules colliding, escaping (evaporating) and agglomerating until a critical nucleus size is reached and a particle is formed. The particle sizes are typically in the range between several nanometers and hundreds of nanometers, provided the conditions for particle agglomeration exist, for example, high enough concentration of aerosol monomers.

This plurality of vessels approach can be used for the generation of multilayered particles. For example, if a first aerosol material has high enough vapor pressure and is chemically inert with respect to the environmental conditions needed to form a second aerosol material, the first aerosol material can be injected into the interior space at any location along the continuous flow path of the particle generator simultaneously with other precursor materials so as to form a multilayered particle.

The particle generator of the present invention has the advantage of operating temperature capabilities at least up to about 1650° C. in aggressive chemical reactions involving halides without the problems associated with susceptor degradation effects associated with other particle generators, since there is a barrier layer between the at least on susceptor and the interior space. Reaction conditions similar to those described for soot particle generation in US Patent Application Publication 2004/0206127 could be withstood without problems associated with susceptor degradation.

In the present invention, the temperature capability of the vessel is limited only by the heat resistance of the barrier layer of choice. For example, a barrier layer comprising quartz or comprising silica glass could provide heat resistance for temperatures up to 2000° C. in the interior space. This temperature may be even greater if an inert carrier gas such as helium is used. Using an inert carrier gas enables operation even at the softening temperature of the barrier material. In some applications, other carrier gases such as argon and nitrogen may be used. The ability to use inexpensive susceptor materials is provided by the susceptor material being separated by the barrier layer from conditions in the interior space which may be harsh depending on temperature and chemical interactions. For example, a particle generator of the present invention having susceptors separated from the interior space by a quartz barrier layer may have susceptors made from inexpensive materials for example, graphite.

As a result, particle synthesis processes can be run very cleanly, without contamination by susceptor decomposition products, hydrocarbon combustion products and/or the presence of oxidizing species and impurities in the interior space. For example, a particle generator of the present invention comprising at least one vessel comprising susceptors separated from the interior space by being encased by an evacuated quartz barrier layer may utilize susceptors made from an inexpensive material, even if that material is susceptible to degradation or susceptible to outgassing. Even in the case where there is a space between the susceptor and the barrier layer which is not evacuated, susceptor degradation byproducts will be trapped in the encasing barrier layer. An evacuated space between the barrier layer and the susceptor helps to maintain the integrity of the susceptor material, even if mechanical degradation of the susceptor occurs. In the embodiments shown in FIG. 3 and FIG. 4, susceptors comprising tungsten, iron, or other substantially conductive materials, even in liquid form upon heating, can function to provide heat to the interior space. It is preferable to have the susceptor material be stable at high temperatures and able to generate heat upon being acted upon by energy from the energy source.

As a result, a wide spectrum of gas-phase chemical reactions can be used for high purity particle forming, including oxidation (e.g., forming particles of oxides), reduction (e.g., forming pure metal particles, as well as those consisting of nitrides and carbides), combination and decomposition, and physical reactions such as vaporization and condensation, as well as their combinations.

For the reasons mentioned above, the particle generator of the present invention has advantages over other particle generators, including ISGs and other tubular generators. Because of the barrier layer and\or alternative electromagnetic energy sources, the present invention permits the use of inexpensive susceptor materials, such as graphite and\or fused silica. Because hot reactants contact only the barrier layer, contamination of the produced particles by products of susceptor decomposition is minimized. As a result, it is possible to run cleaner particle synthesis processes at high temperatures with a harsh chemical environment and/or abrasive environment. Also, corrosion of the susceptor is minimized, thus deterioration of the susceptor's mechanical and heat generating properties are minimized.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A particle generator comprising at least one vessel comprising:
    (a) an interior space for accommodating the passage of reactant material therethrough, (b) at least one susceptor capable of generating heat when acted upon by energy and being disposed such that a temperature sufficient to heat the reactant material within a predetermined range is achieved within the interior space; and (c) a heat-transmitting barrier layer interposed between said susceptor and the interior space for isolating said susceptor from the reactant material, wherein the barrier layer encases said susceptor, and wherein an evacuated space is present between the barrier layer and said susceptor.

2. The particle generator of claim 1 wherein the susceptor is selected from the group consisting of ceramic materials, quartz, silica glass, molybdenum, platinum, rhodium, graphite and a platinum\rhodium compound.

3. The particle generator of claim 1 further comprising a plurality of vessels providing a continuous flow path wherein the plurality of vessels are connected in sequence such that the interior space of each of the plurality of vessels is in fluid communication with the interior space of the next vessel in sequence.

4. The particle generator of claim 3 wherein said continuous flow path is disposed such that turbulent flow causes mixing of the material in at least one of the plurality of vessels.

5. The particle generator of claim 3 wherein said energy source of each of the plurality of vessels is independent from each other for individual heating of each of the vessels.

6. The particle generator of claim 3 wherein at least one of the plurality of vessels is a preheater for heating material to a temperature less than the temperature required for particle generation.

7. The particle generator of claim 3 further comprising at least one inlet transversing the barrier layer for introducing precursor materials at a desired location along the continuous flow path.

* * * * *